United States Patent [19]

Denk et al.

[11] 4,434,881
[45] Mar. 6, 1984

[54] HIGH SPEED ACCESSORY DISCONNECT APPARATUS AND METHODS

[75] Inventors: Jpseph Denk, Manhattan Beach; William B. Martin, Redondo Beach, both of Calif.

[73] Assignee: The Garrett Corporation, Los Angeles, Calif.

[21] Appl. No.: 245,419

[22] Filed: Mar. 19, 1981

[51] Int. Cl.³ .................. F16D 43/25; F16D 11/04
[52] U.S. Cl. .................. 192/89 A; 192/82 T; 192/101; 192/0.03
[58] Field of Search .............. 192/89 A, 89 R, 82 T, 192/101, 150, 3.58, 28, 24, 67 R, 0.03

[56] References Cited

U.S. PATENT DOCUMENTS

| | | |
|---|---|---|
| 1,367,309 | 2/1921 | Dunham . |
| 1,885,420 | 11/1932 | Dorman . |
| 2,509,813 | 5/1950 | Dineen . |
| 2,642,970 | 6/1953 | Szekely .................. 192/24 |
| 2,718,947 | 9/1955 | Yinger . |
| 2,951,570 | 9/1960 | Antrim, Jr. et al. . |
| 3,001,620 | 9/1961 | Olchawa et al. . |
| 3,080,030 | 3/1963 | Troeger . |
| 3,080,031 | 3/1963 | Young . |
| 3,126,080 | 3/1964 | Travis et al. . |
| 3,132,731 | 5/1964 | Shipley . |
| 3,220,218 | 11/1965 | Rio et al. . |
| 3,568,469 | 3/1971 | Wade et al. . |
| 3,620,045 | 11/1971 | Butterfield . |
| 3,620,046 | 11/1971 | Wenzel et al. . |
| 4,013,152 | 3/1977 | Jones .................. 192/24 |
| 4,244,455 | 1/1981 | Loker . |

FOREIGN PATENT DOCUMENTS 822178 11/1951 Fed. Rep. of Germany .
1256027 12/1967 Fed. Rep. of Germany .
571300 5/1924 France .

OTHER PUBLICATIONS

McGraw-Hill, Encyclopedia of Science and Technology, vol. 2, 1960, p. 421, New York (USA).

Primary Examiner—George H. Krizmanich
Attorney, Agent, or Firm—J. Richard Konneker; Albert J. Miller

[57] ABSTRACT

A disconnect member is spline-connected to one end of the connecting drive shaft of an engine and a driven accessory, and is axially translatable into and out of coupling engagement with the engine. The disconnect member has a spiraled, axially ramped cam surface formed thereon which cooperates with a rotatable cam follower selectively movable into engagement therewith to axially drive the rotating disconnect member relative to the cam follower, thereby uncoupling the engine from its driven accessory. When the cam follower is disengaged from the cam surface, a reset spring automatically recouples the disconnect member to the engine.

27 Claims, 7 Drawing Figures

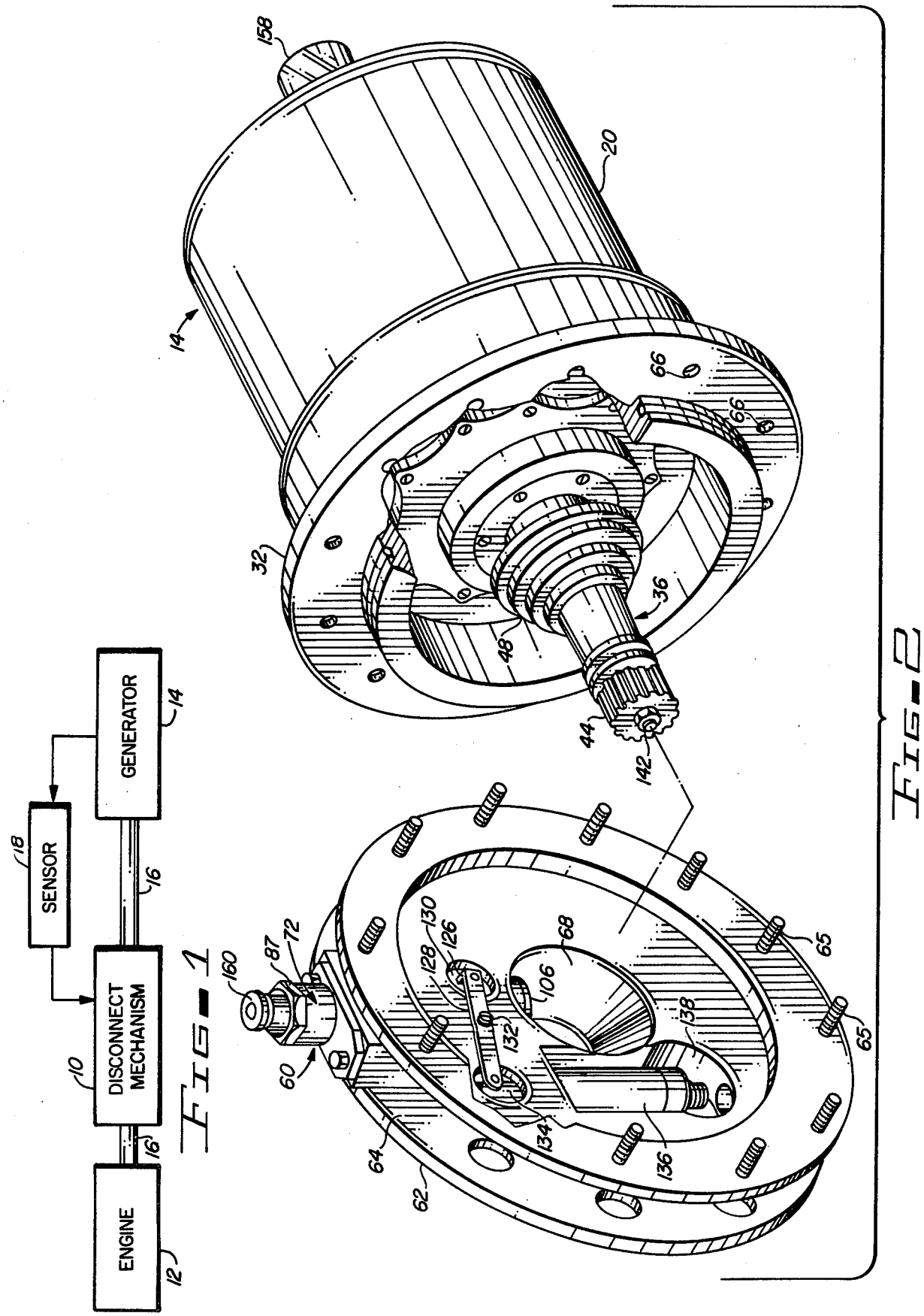

HIGH SPEED ACCESSORY DISCONNECT APPARATUS AND METHODS

BACKGROUND OF THE INVENTION

The present invention relates generally to apparatus and methods for uncoupling driving and driven mechanisms during operation thereof, and more particularly provides high speed, reusable and easily resettable accessory disconnect apparatus, and associated methods, for very rapidly decoupling an engine from a driven accessory without imposing excessive stress on either the disconnect apparatus or the accessory.

A wide variety of disconnect devices have heretofore been employed to uncouple driving mechanism, such as engines, from accessory devices which they customarily operate by means of a drive shaft coupled at its opposite ends to the engine and accessory. However, especially in high speed applications, conventional disconnect devices present one or more of several well known and long-standing problems.

As an example, in one very common disconnect system, the drive shaft is splined at its opposite ends and is slidably coupled to the engine and accessory so that axial movement of the shaft will effect its disconnection from one of them. A nut member having a radially outwardly projecting stop portion thereon is threadedly mounted on an intermediate portion of the shaft and rotates therewith under normal operating conditions. To cause the disconnecting axial motion of the shaft, a pin or other rigid element is moved into the path of the rotating stop member. The stop member slams into the pin and instantaneously stops the rotation of the nut member. The shaft, still rotationally driven by the engine, axially advances itself relative to the stationary nut member to cause uncoupling of the engine and accessory.

Especially at high shaft speeds, this impact places a great deal of stress on the pin and can easily shatter it or bend it, thereby causing the disconnect mechanism to fail, in turn potentially damaging the accessory, the engine or both if a malfunction of either necessitated their disconnection in the first place. Moreover, it is important to note that the circumferential "window" presented by the rotating stop surface for receiving the pin is often guite limited, the stop portion itself very rapidly sequentially blocking and unblocking the movement of the pin trying to engage and stop it. The higher the shaft speed, the more difficult it is for the pin to properly engage the stop. As in the case of shattering or bending the pin, this problem can also cause the disconnect system to fail, or at least substantially increase the time required for disconnection to occur.

Other previously used disconnect systems have approached these stress and reliability problems by connecting separate portions of the drive shaft with a linking member purposely designed to be broken (by other components of the disconnect mechanism) when disconnection is desired. This, of course, negates the possibility of reusing or resetting the mechanism. It is good only for one use. Additionally, there is always the concern that the drive shaft's weak link will unexpectedly break of its own accord, leaving the engine-accessory system inoperative until the one-use disconnect system is rebuilt. In a great many applications, this situation is simply unacceptable.

It can be seen that there is a need for a high speed engine-accessory disconnect system which is reusable, highly reliable, operates with minimal stress on its components, and is easily and quickly resettable. Accordingly, it is an object of the present invention to provide such a system and to thereby eliminate or minimize above-mentioned and other problems and disadvantages associated with previous disconnect systems.

SUMMARY OF THE INVENTION

The present invention provides a high speed engine-accessory disconnect system which includes shaft means for rotationally coupling the engine and its driven accessory. Defining a portion of the shaft means is a uniquely configured disconnect member. The disconnect member is mounted on the balance of the shaft means for locked, conjoint rotation therewith and relative axial movement with respect thereto into and out of coupling engagement with the engine to effect connection and disconnection of the engine and accessory.

Formed on the disconnect member are cam means having an axially ramped driving surface. A cam follower, movable into and out of engagement with the cam surface is rotatably supported adjacent the disconnect member. When it is desired to effect disconnection of the engine, the cam follower is moved, by activation means, toward the disconnect member and is engaged by the driving surface of the cam. The cam surface smoothly interacts with the cam follower, without imposing excessive stress on the disconnect system, the engine or the accessory, and without appreciably hindering rotation of the disconnect member, to advance the cam relative to the follower, thereby translating the disconnect member out of coupling engagement with the engine.

Spring means are provided for absorbing translational energy of the disconnect member during its uncoupling motion, and stop means are provided for limiting its travel during disconnection. When such uncoupling motion of the disconnect member is complete, the cam follower interacts with the cam means to preclude re-engagement between the disconnect member and the engine.

Reset means are provided for subsequently moving the cam follower out of engagement with the cam. The spring means then automatically move the disconnect member back into rotationally locked connection with the engine, thus recoupling the engine and accessory.

According to a feature of the present invention, the driving surface of the cam is configured to cause the cam to move relative to the follower with substantially constant acceleration during disconnection to thereby substantially reduce axial stress imposed upon the shaft means and transmitted to the accessory.

BRIEF DESCRIPTION OF THE DRAWINGS

FIG. 1 is a schemtic block diagram of an engine-generator drive system which utilizes a high speed disconnect mechanism employing principles of the present invention;

FIG. 2 is a partially exploded perspective view of the generator and disconnect assembly portion of the drive system;

DETAILED DESCRIPTION

Figure 3:
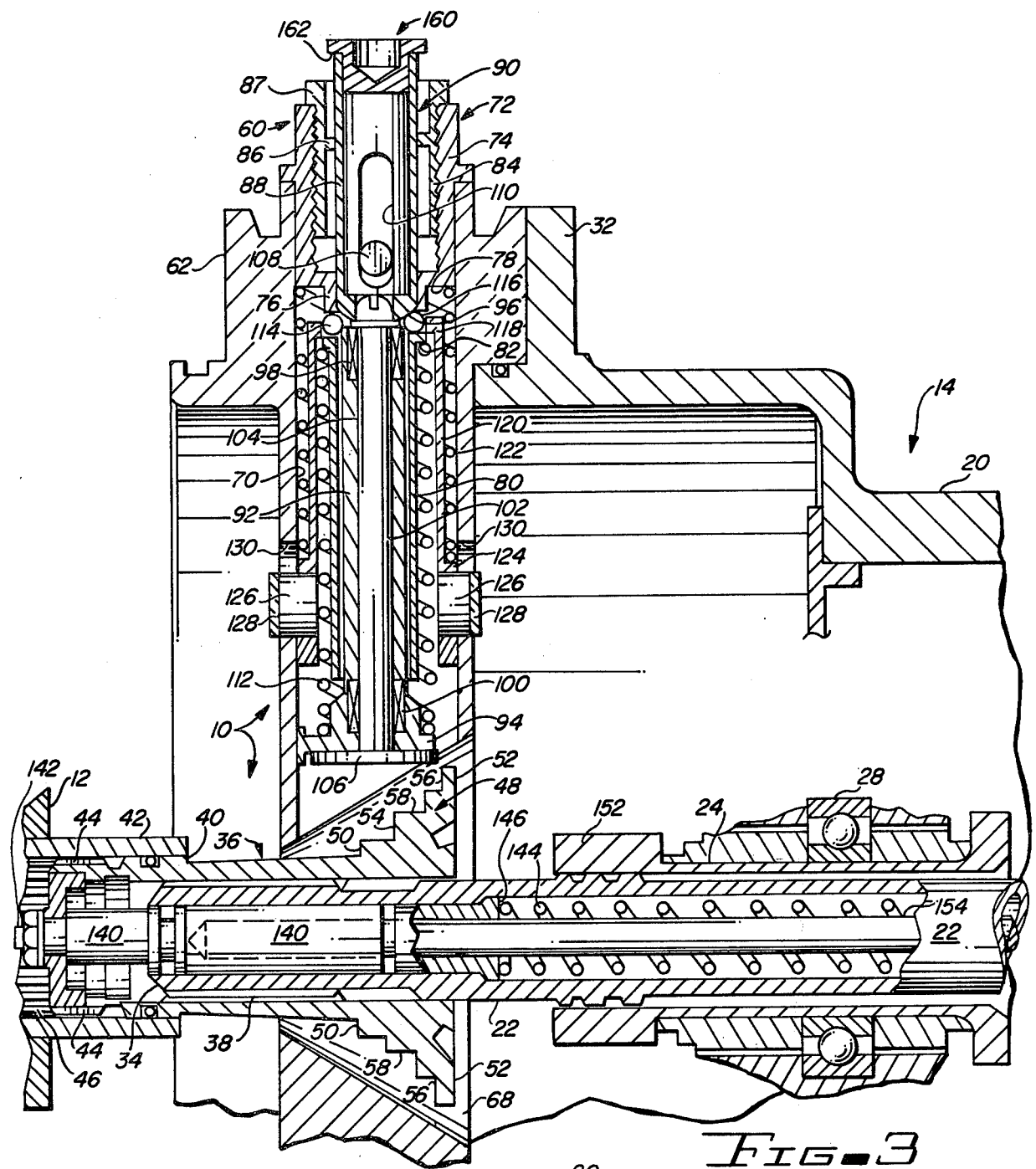
FIG. 3 is a partially fragmented cross-sectional view taken through the disconnect mechanism, and adjacent portions of the engine and generator, with the components of the disconnect mechanism in their inactivated positions.

As schematically illustrated in FIG. 1, the present invention provides a high speed accessory disconnect mechanism 10 which is interposed between a driving mechanism, such as an engine 12, and a driven necessary, such as a generator 14, rotationally coupled by shaft means 16. Upon detecting a malfunction in the generator 14, a sensor 18 activates the disconnect mechanism 10 which functions to substantially immediately uncouple the shaft means from the engine, thereby terminating rotational power transfer from the engine to the generator to protect the generator from potentially serious damage arising from continued operation thereof.

Figure 6:
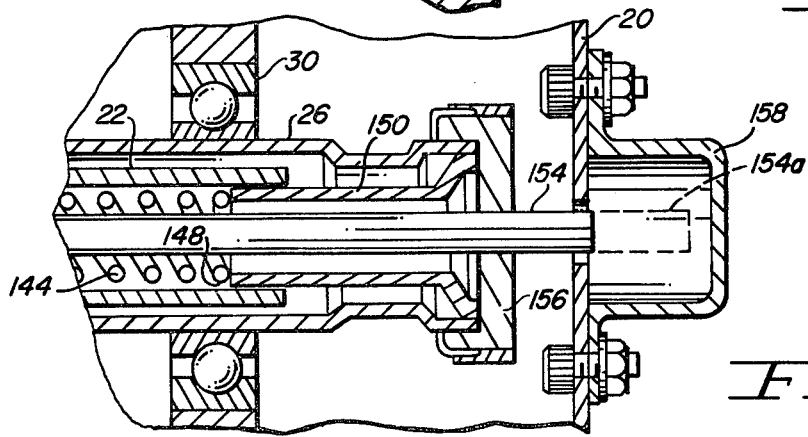
FIG. 6 is a fragmentary cross-sectional view taken through a right end portion of the generator of FIG. 2.

Referring to FIGS. 2, 3 and 6, the generator 14 includes a generally cylindrical housing 20 through which a hollow drive shaft 22 axially extends. Shaft 22 is splined or otherwise secured or conjoint rotation to and within hollow cylindrical shaft carrying members 24, 26 which are themselves rotatably supported within the generator housing by bearings 28, 30 respectively. The generator housing 20 is open at its left end and is somewhat radially enlarged along a left end portion as indicated. Adjacent the left end of the housing is a radially outwardly projecting mounting flange 32. Generator shaft 22 projects outwardly beyond the open end of the housing and has an outer end 34.

The disconnect apparatus 10 includes a hollow, generally cylindrical disconnect member 36 (shown isometrically in FIG. 4) which axially receives an outer end portion of the generator drive shaft 22. Mating splines and grooves 38 on the shaft 22 and the interior of the disconnect member 36 rotationally lock the member 36 to the shaft 22, but permit axially movement of member 36 relative to the generator shaft 22.

A left or outer end portion of the disconnect member 36 extends axially into an open end 40 of a hollow, generally cylindrical rotational power output portion 42 of the engine 12. The outer end of the disconnect member 36 has formed thereon axially extending external splines 44 which are slidably received in internal, axially extending grooves 46 formed within the engine power output member 42. Rotational power is thus transmitted from the engine 12 to the generator drive shaft 22 through the disconnect member splines 44, the disconnect member 36, and the generator shaft splines 38. The generator shaft 22, the disconnect member 36, and the engine power output member 42 thus collectively define the shaft means 16 shown in FIG. 1. It can be seen in FIG. 3 that by moving disconnect member 36 rightwardly relative to the generator drive shaft 22 the disconnect member splines 44 can be moved out of engagement with the engine output member 42, thereby uncoupling the generator 14 from the engine 12.

To accomplish this disconnect function, the disconnect member 36 has formed thereon, along a right or inner end portion thereof, a generally frustoconically shaped cam portion 48 having an inner end surface 50 defining a leftwardly facing radially outwardly projecting abutment on the disconnect member, and a rightwardly facing outer end surface 52 having a diameter substantially greater than the diameter of the inner end surface 50.

Figure 4:
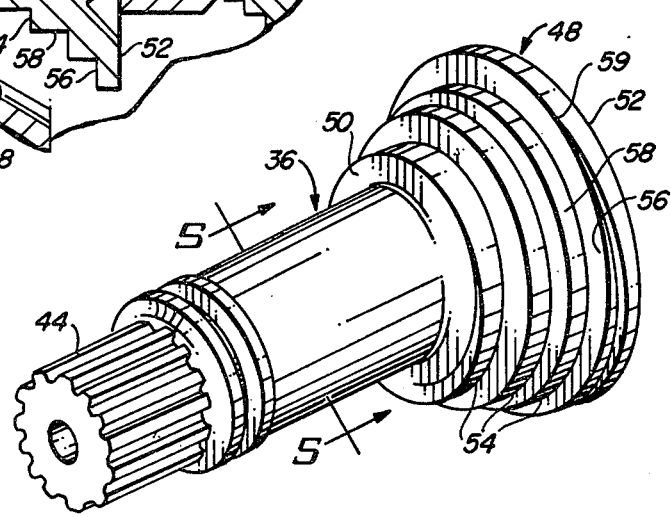
FIG. 4 is a perspective view of a disconnect member utilized in the present invention.

As can best be seen in FIG. 4, the cam portion 48 has formed along its radially outwardly facing side surface a spiraled cam track 54. Beginning at the radially outer surface of the abutment 50, the cam track 54 spirals simultaneously radially outwardly and axially toward the outer end surface 52 of the cam portion 48. The cam track 54 is defined, at each position along its conically spiraled length, by generally mutually perpendicular cam path surfaces 56, 58. Spiraled cam surface 56 (also referred to herein as a "driving" surface) faces, along its length, leftwardly and generally axially relative to the disconnect member, and cam surface 58 faces radially outwardly, along its length, relative to the disconnect member. It can be seen that cam surface 56 defines an axially ramped surface on the cam portion 48. More specifically, progressing from its rightmost origination point 59 (FIG. 4) in a clockwise direction along its spiraled length, each successive portion on the cam driving surface 56 is positioned closer to the cam abutment 50 than the preceding portion.

Referring to FIGS. 2 and 3, the disconnect mechanism 10 also includes a cam follower mechanism 60 which is carried by a generally cylindrical mounting member 62 which has a radially inwardly extending peripheral groove 64 formed therein and is coaxially secured to the generator housing 20 by means of bolts 65 received in threaded openings 66 in the mounting flange 32. The mounting member 62 has a central opening 68 extending axially therethrough, the surface of the opening being sloped rightwardly and radially outwardly as viewed in FIG. 3. Generator shaft 22, and disconnect member 36 slidably mounted thereon, extend outwardly through the central opening 68, with the cam portion 48 being positioned therein as can best be seen in FIG. 3.

A circular bore 70 (FIG. 3) is formed inwardly through the peripheral groove 63, radially through the cylindrical mounting member 62, and into the central opening 68. The bore 70 receives and retains a hollow housing portion 72 of the cam follower mechanism 60. Housing 72 has a circular cross-section, an upper portion 74, a smaller diameter intermediate portion 76 defining with the upper portion an abutment 78, and a lower, still smaller diameter portion 80 defining with the intermediate portion an abutment 82.

A tubular reset member 84, having an internal flange 86 and a hexagonally shaped upper end portion 87, is threadedly received within the upper portion 74 of the housing 72. The internal flange 86 and the intermediate portion 76 of the housing 72 slidably receive an upper portion 88 of a tubular guide member 90. Guide member 90 has a smaller diameter lower section 92 having, at its lower end, a radially outwardly directed flange 94. Formed at the juncture of the upper and lower sections of the guide member 90 is a radially inwardly sloping stop surface 96.

Rotatably supported within the lower section 92 of the guide member 90 by bearings 98, 100 at opposite ends thereof is a shaft 102 which is axially retained within the guide member by a screw 104 passing axially downwardly through the shaft, the screw head overlying the upper bearing 98. Formed integrally with, or otherwise fixedly secured to the lower end of the shaft 102 is a disc-shaped cam follower or activating member 106 whose upper end surface seats against the undersurface of the flange 94. Rotation of guide member 90 relative to the housing 72 is precluded by a pin 108 fixed to the housing 72 and extending inwardly through an elongated, axially extending slot 110 formed through the upper portion 88 of guide member 90. The side surfaces of the slot 110 interact with pin 108 to preclude rotation of the guide member about its axis, but slot 110 permits axial translational movement of the guide member 90 relative to the housing 72.

A compression spring 112, circumscribing the lower portion 80 of housing 72 and seated between the abutment 82 and the lower guide member flange 94, exerts a downward biasing force on the guide member (and thus the cam follower 106). Guide member 90 is retained in the position shown in FIG. 3 (i.e., with the cam follower 106 positioned slightly above the cam portion 48 of the disconnect member 36), against the biasing force of spring 112, by means of locking balls 114 received in openings 116 formed through the intermediate portion 76 of housing 72. Locking balls 114 are held in seating engagement with the guide member stop surface 96 above them, thereby precluding downward movement of the guide member by spring 112, by an interior flange 118 positioned at the upper end of a tubular latch member 120 which circumscribes the spring 112 and is of a slightly smaller diameter than circular bore 70. A reset spring 122, circumscribing the tubular latch member 120 and seated against the housing abutment 78 and an external peripheral flange 124 at the lower end of the latch member 120, exerts a downward biasing force on latch member 120.

Tubular latch member 120 is held in the position shown in FIG. 3 (wherein the upper latch member flange 118 maintains the locking balls 114 in seating engagement with the sloped guide member stop surface 96), against the biasing force of spring 122, by means of inwardly turned end portions 126 of a pair of latch arms 128 positioned on opposite sides (See FIG. 2) of the cylindrical mounting member 62. These latch arm end portions 126 extend inwardly through openings 130, formed through the mounting member 62, and into suitable openings formed through a lower end portion of the tubular latch member 120.

Each of the latch arms 128 is centrally pivoted at 132 (FIG. 2) to the cylindrical mounting member 62 and also pivoted at their outer ends to the operating shaft 134 of a solenoid 136 mounted in an opening 138 formed through the mounting member 62.

The components of the disconnect mechanism 10 illustrated in FIG. 3 are in their normal operating positions and are ready for activation in the event that a malfunction of the generator 14 is detected by the sensor 18. As previously described, during normal engine-accessory system operation the engine rotationally drives the disconnect member 36 which, in turn, rotationally drives the generator shaft 22.

Upon sensing a malfunction of the generator 14, sensor 18 energizes the solenoid 136, causing a downward movement (as viewed in FIG. 2) of its operating shaft 134. This, in turn, pivots the latch arms 128 in a counterclockwise direction, forcing the tubular latch member 120 upwardly within the housing 72 (FIG. 3) and moving the ball-retaining flange 118 to a position above the locking balls 114, freeing them for outward movement. The downward force of the compression spring 112 on the guide member 90 then causes the sloped stop surface 96 to cam the locking balls outwardly and permit the spring 112 to drive the guide member 90 downwardly. The downward movement of the guide member 90 forces the undersurface of the cam follower 106 into engagement with the spiraled cam surface 58. The cam follower 106 initially engages the cam surface 58 at or adjacent its uppermost point (i.e., at a portion of the surface 58 adjacent the right end 52 of the cam portion 48). Spring 112 maintains the cam follower 106 in contact with the cam surface 58 while the cam 48 continues to be rotated by the generator shaft 22.

At, or very rapidly after, the initial engagement between cam follower 106 and the cam surface 58, the frustroconically spiraled cam surface 56 of the rotating cam 48 engages the periphery of the cam follower 106. Since the cam follower shaft 102 is precluded from transverse movement by the bearings 98, 100, the cam follower 106 is precluded from movement parallel to the axis of disconnect member 36. The contact between cam surface 56 and cam follower 106 during rotation of cam 48 thus causes rapid rightward movement of cam 48, thereby uncoupling the disconnect member 36 from the engine 12 to protect the generator 14. Spring 112 retains the cam follower against the cam surface 58 during this axial cam movement, thereby maintaining proper positioning between the cam follower periphery and the driving cam surface 56. Stated otherwise, as the cam rightwardly advances itself relative to the horizontally stationary cam follower which it engages, the cam follower is moved progressively downwardly along the conically spiraled cam track 54 by the spring 112.

It is important to note that during interengagement between the cam and its follower, the follower is rotated by the axially advancing cam. The cam follower is thus in rolling frictional engagement with the cam. Therefore, even at very high shaft speeds, very little wear is experienced by the cam and its follower. Moreover, the only impact between the follower and the cam is the rather minor one occurring when the follower initially contacts the cam surface 58. Further, unlike conventional disconnect devices (for example of the drop-pin type), the rotation of the disconnect member 36 is not appreciably hindered during disconnection of the engine and its driven accessory. This greatly reduces the shock imposed upon the disconnect member.

As the disconnect member is rapidly driven rightwardly by the smooth, rolling interaction between the cam 48 and its follower 106, a cylindrical reset member 140 (FIG. 3), which is slidably received within a left end portion of the generator shaft 22 and is connected to the left end of the disconnect member 36 by a bolt 142, is driven rightwardly by the disconnect member. The rightwardly moving reset member 140 compresses a reset spring 144 positioned within the hollow generator shaft 22 and seated against a front end face 146 of the reset member 140 and an inner end face 148 (FIG. 6) of a tubular inset member 150 having an inner end portion retained within the open right end of the generator shaft 22.

Figure 3A:
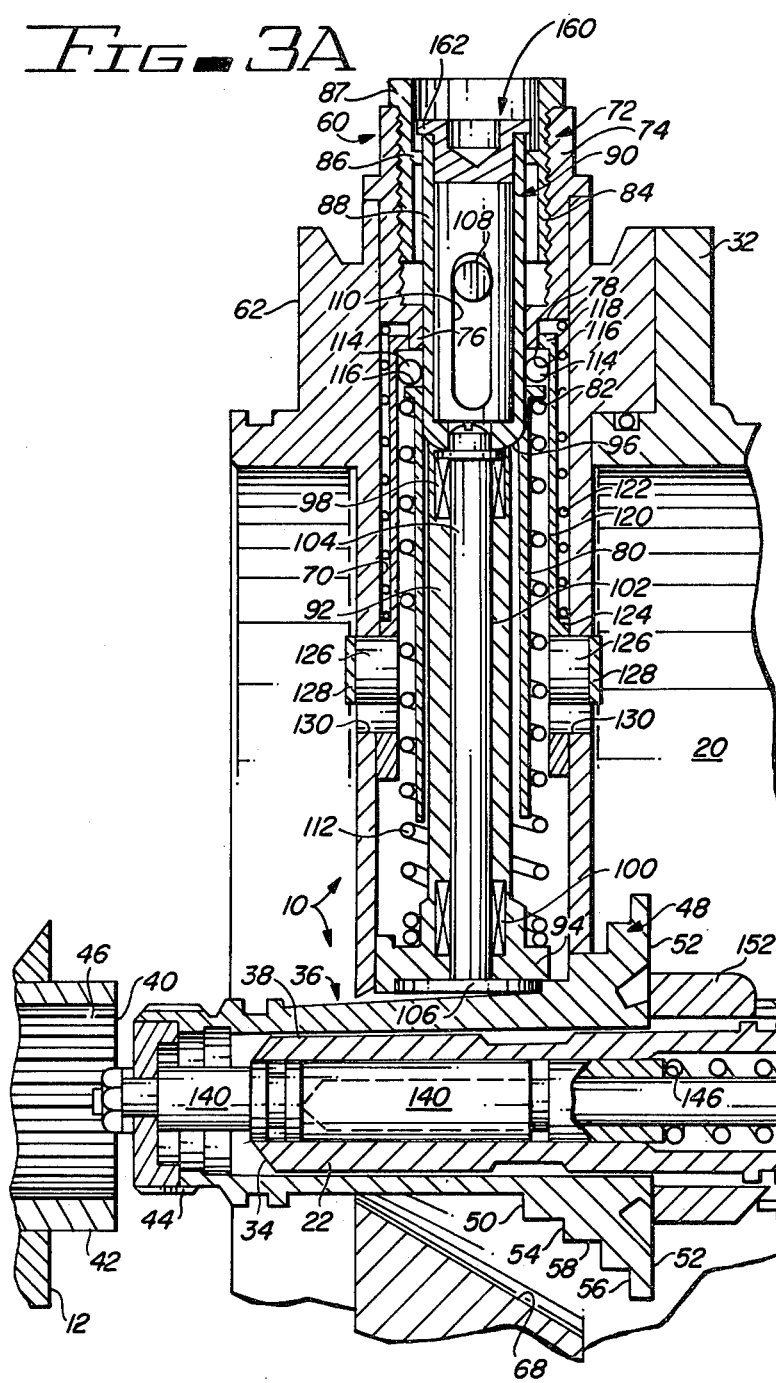
FIG. 3A is a view similar to FIG. 3, but with the disconnect mechanism components illustrated in their activated positions.
Figure 5:
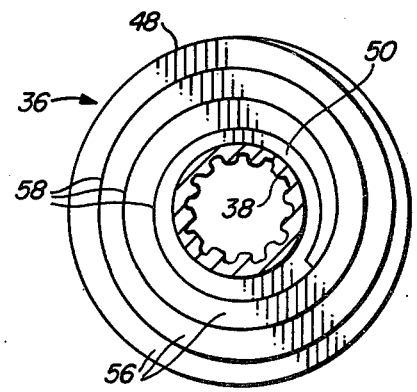
FIG. 5 is a cross-sectional view taken through the disconnect member along line 5—5 of FIG. 4.

When the cam follower 106 reaches the end of the cam track 54, it is forced by the spring 112 off the track of the member 36 to the left of the cam abutment surface 50 as indicated in FIG. 3A. At this point in time the splines 44 on the disconnect member 36 are completely withdrawn from the engine output member grooves 46 and the generator is completely disconnected from the engine. A stop member 152 circumscribes and is secured to the generator shaft 22, to the right of the cam 48, and functions to limit the cam's rightward travel. With the cam follower in the position indicated in FIG. 3A, the cam follower serves as latch means, against which the cam stop surface 50 is forced leftwardly by the generator shaft reset spring 144, for holding the disconnect member 136 in its completely disengaged position.

As the cam 48 is moved rightwardly to its disconnected position indicated in FIG. 3A, a tubular indicating rod 154 (FIGS. 3, 3A and 6), having a left end portion retained within the reset member 140 and a right end portion slidably mounted in an end plate 156 (FIG. 6) connected to the support member 26, is moved outwardly through the right end of the generator housing 20 into a glass enclosure 158 secured thereon, as indicated in phantom by the numeral 154a. The presence of a right end portion of the indicating rod 154 within the glass enclosure gives a visual indication that the generator has been disconnected from the engine.

A second visual disconnect indication is provided by means of a small cam follower position indicator 160, threaded into the upper end of the guide member 90, which projects slightly above the upper end of the housing 72 when the guide member is in its latched position indicated in FIG. 3. When the disconnect mechanism is activated as previously described, the indicator 160 is withdrawn downwardly into the housing 72 by the guide member 90 (as shown in FIG. 3A) so that the indicator is no longer visible. Thus, when the indicator 160 is visible above the top of the housing 72, the disconnect mechanism is in its inactivated state, an when the indicator is not visible, the disconnect mechanism has been activated.

The reset spring 144 within the generator shaft 22 functions to absorb translational energy of the disconnect member during its rightward disconnect movement to thereby limit the stress imposed upon the generator shaft 22 (as well as upon other components of the generator) when the cam 48 strikes the stop member 152. Additionally, the cam track 54 is specially designed to impart to the disconnect member 36, during its rightward disconnecting motion, a substantially constant acceleration. It has been found in the development of the disconnect mechanism illustrated and described herein that this constant acceleration feature serves to further substantially reduce the axial stress imposed upon the generator shaft 22, and other components of the generator, caused by activation of the disconnect mechanism.

This very advantageous constant acceleration feature of the disconnect member 36 is achieved by configuring the axially ramped cam surface 56 so that the axial distance between any two points along its length is a function of the square of the angle, in radians, through which the surface length between the two points extends. More specifically, the equation for the entire surface 56, beginning at its rightmost origination point 59 in FIG. 4, is $S = c\theta^2$, where S is the distance of any given point on the surface 56 from such origination point, $\theta$ is the total angular separation, in radians, between the two points along the intervening length of surface 56, and c is a dimensional conversion factor.

In addition to its other structural and operational advantages, the disconnect mechanism 10, which represents a preferred embodiment of the present invention, is particularly easy to reset. Referring to FIG. 3A, which shows the components of the disconnect mechanism in the positions to which they are brought after disconnecting the generator from the engine, the mechanism is reset by simply unscrewing the reset insert 84. This causes the internal flange 86 on the reset insert to engage an external flange 162 on the top of the indicator member 160 and move the guide member 90 and the cam follower 106 upwardly. When the guide member 90 is lifted to the position shown in FIG. 3 (and with the solenoid 136 de-energized) the reset spring 122 moves the tubular latch member 120 downwardly. This causes a clockwise pivoting of the latch arms 128 (as viewed in FIG. 2) and brings the interior flange 118 of the latch member 120 into engagement with the locking balls 114, forcing them inwardly into engagement with the sloped stop surface 96 of the guide member 90 to thus hold the guide member and the cam follower in the positions indicated in FIG. 3. As the cam follower 106 is lifted out of engagement with the cam abutment surface 50, the reset spring 144 within the generator shaft 22 forces the disconnect member 36 leftwardly to automatically cause re-engagement of the disconnect member splines 44 with the grooves 46 in the engine rotational output member 42. The reset member 84 is then screwed down to its original position as indicated in FIG. 3, once again exposing the disconnect indicator 160.

While in the preferred embodiment of the disconnect mechanism illustrated and described herein the spiraled, ramped cam driving surface 56 is axially configured to drive the cam from the follower with a substantially constant acceleration, it could, of course, be alternatively configured to drive the cam with any other desired acceleration (and/or velocity) characteristics to suit different applications. Moreover, if desired, the cam could be constructed with a nonspiraling axially ramped side surface and the downward force of a cam follower used to "wedge" the cam rightwardly through its disconnect motion. As but one example of such alternative construction, the cam could be of a frustroconical shape (i.e., without the cam track formed therein, the side surface of such cam thus defining an axially ramped, but nonspiraled engagement surface), and a spherically shaped rotatable cam follower used to cause axial motion of the disconnect member.

It is important to note that the illustrated disconnect mechanism 10 is not only reusable, but affords yet a further distinct advantage over previous disconnect devices—extreme reliability in even very high speed applications. Each successive spiral of the track or groove 54 is circumferentially contiguous with the preceding spiral, and is defined by the generally radially facing surface 58 and the generally axially facing surface 56. The specially configured cam 48 thus provides a continuous circumferential "window", completely circumscribing the cam's axis and extending leftwardly from the right track end point 59 (FIG. 4), for the cam follower to radially enter the spiraling track 54. Regardless, therefore, of the rotational speed of the cam, or its rotational orientation relative to the follower (which is positioned slightly axially inwardly of track end 59, and thus slightly axially inwardly of the rightmost spiral of driving surface 56), radial entry of the cam follower 106 into the cam track or groove means 54 is totally unimpeded.

In sum, the cam is configured, and positioned relative to its follower, so that no portion of the cam can, even for an instant, block the radial entry of the follower into the track. This assures a positive, substantially instantaneous interengagement between the cam follower 106 and the driving surface 56 upon activation of the disconnect mechanism 10.

The foregoing detailed description is to be clearly understood as given by way of illustration and example only, the spirit and scope of this invention being limited solely by the appended claims.

What is claimed is:

1. High speed apparatus for disconnecting a driving mechanism from a driven mechanism rotationally coupled thereto by shaft means, at least a portion of the shaft means being axially movable out of coupling engagement with one of the mechanisms, said apparatus comprising:
    (a) cam means mounted coaxially on the shaft means for rotation and axial movement therewith, said cam means having axially spiraling groove means thereon; and
    (b) cam follower means, selectively movable generally radially into said groove means during rotation of said cam means for interacting with a surface of said groove means to axially drive at least a portion of the shaft means relative to said cam follower means and out of engagement with one of the mechanisms, said groove means being configured to permit unimpeded entry of said cam follower means thereinto regardless of the rotational orientation of said cam means relative to said cam follower means.

2. The apparatus of claim 1 wherein generally the spirals of each adjacent pair of spirals of said groove means are circumferentially contiguous.

3. The apparatus of claim 2 wherein each of said spirals of said groove means is defined by two surfaces, one of said surfaces facing at least generally radially relative to the shaft means, the other of said surfaces facing at least generally axially relative to the shaft means, at each position along the circumference of the spiral.

4. The apparatus of claim 1 wherein said groove means are configured so that at least a portion of the shaft means is driven out of engagement with one of the mechanisms with a substantially constant acceleration in response to interaction between said cam follower means and said groove means.

5. The apparatus of claim 1 wherein, subsequent to disengagement of the shaft means from said one of the mechanisms, said cam means and said cam follower means cooperate to prevent undesired reengagement between the shaft means and said one of the mechanisms.

6. A drivable mechanism having integral disconnect apparatus and comprising:
    (a) a rotatable drive shaft;
    (b) a disconnect member having an axis, means for axially releasably coupling said disconnect member to a driving mechanism for rotation thereby about said axis, and a spiraled drive track circumscribing said axis;
    (c) means coaxially mounting said disconnect member on said drive shaft for axial movement relative thereto and precluding appreciable relative rotation between said disconnect member and said drive shaft; and
    (d) disconnection activating means selectively movable generally radially into said drive track for interacting therewith in a manner causing axial movement of said disconnect member inwardly along said drive shaft without substantially hindering rotation of said disconnect member during said axial movement thereof, said drive track being configured to permit unimpeded entry of said activating means thereinto regardless of the rotational orientation of said disconnect member relative to said activating means.

7. The mechanism of claim 6 wherein said mechanism is a generator.

8. The mechanism of claim 6 wherein said coupling means and said mounting means include spline means extending axially along said disconnect member.

9. The mechanism of claim 6 further comprising spring means, resisting axial movement of disconnect member inwardly along said drive shaft, for moving said disconnect member outwardly along said drive shaft in response to disengagement of said activating means from said disconnect member, and stop means carried by said drive shaft for limiting the inward travel of said disconnect member along said drive shaft.

10. The mechanism of claim 6 wherein said driving surface is configured so that said axial movement of said disconnect member has a substantially constant acceleration.

11. The mechanism of claim 6 further comprising means associated for movement with said activating means for visually indicating the position of said disconnect member.

12. The mechanism of claim 6 further comprising means associated for movement with said disconnect member for visually indicating the position of said activating means.

13. A disconnect member adapted to couple first and second axially aligned objects for conjoint rotation, said disconnect member having an axis and comprising:
    (a) means for coaxially mounting said disconnect member on the first object for axial movement relative thereto between first and second positions, and for precluding appreciable rotation of said disconnect member relative to the first object;
    (b) means for axially releasably engaging the second object to rotationally couple said disconnect member in said first position to the second object, and for uncoupling said disconnect member from the second object in response to a disconnecting movement of said disconnect member toward said second position; and
    (c) spiraled groove means coaxial with said axis, said groove means being adapted to receive a third object inserted generally radially thereinto to responsively cause said disconnecting movement of said disconnect member during axial rotation thereof, each spiral of said groove means being defined by two surfaces, one of said surfaces facing at least generally radially outwardly, each adjacent pair of spirals of said groove means being circumferentially contiguous.

14. The disconnect member of claim 13 wherein said mounting means and said engaging means are splines extending axially of said disconnect member.

15. The disconnect member of claim 13 wherein said mounting means include internal splines extending axially of said disconnect member, and said engaging means include external splines extending axially of said disconnect member.

16. The disconnect member of claim 13 wherein the other of said two surfaces of said spiraled groove means progresses axially along its length in a nonuniform manner.

17. The disconnect member of claim 13 wherein the axial separation between any two points along the spiraled length of said other surface is a function of the square of the total angle traversed along said spiraled length between said two points.

18. Drivingly coupled apparatus comprising:
(a) an engine adapted to transmit rotational power;
(b) a rotationally drivable accessory;
(c) shaft means rotatably coupling said engine and accessory, at least a portion of said shaft means being axially movable to effect disconnection of said engine and accessory;
(d) cam means carried by said shaft means for rotation therewith, said cam means being operable without significant rotational retardation thereof to axially move said shaft means to thereby cause said disconnection, said cam means having formed thereon spiraled groove means engageable to operate said cam means during rotation thereof, said groove means being defined by two surfaces spiraled coaxially around said shaft means, one of said surfaces facing generally axially relative to said shaft means, and the other of said surfaces facing generally radially relative thereto, the spirals of each adjacent pair of spirals of said groove means being circumferentially contiguous;
(e) cam follower means engageable with said groove means to operate said cam means;
(f) guide means, having an axis generally perpendicular to said shaft means, for carrying said cam follower means for rotation about said axis, said guide means having an external circumferential stop surface facing said shaft means;
(g) housing means slidably receiving said guide means for axial movement relative thereto between a first position in which said cam follower means are spaced radially outwardly of said cam means, and a second position in which said cam follower means engage said groove means, said housing means precluding appreciable rotation of said guide means and further precluding appreciable movement of said guide means parallel to the longitudinal extent of said shaft means, said housing means having an opening extending therethrough;
(h) a locking member received in said housing means opening for movement into and out the path of said guide means stop surface;
(i) latch means circumscribing said guide means and carried within said housing for movement parallel to said guide means axis between latched and unlatched positions, said latch means in said latched position forcing said locking member into the path of said guide means stop surface when said guide means are in said first position to thereby preclude movement of said guide means toward said second position, said latch means in said unlatched position permitting movement of said locking member by said stop surface to allow movement of said guide means toward said second position;
(j) biasing means urging said guide means toward said second position; and
(k) means, responsive to a malfunction of said accessory during operation thereof by said engine, for automatically moving said latch means from said latched position to said unlatched position to permit said biasing means to drive said guide means from said first position to said second position to cause said disconnection.

19. The apparatus of claim 18 wherein said generally axially facing surface progresses along its spiraled length in an axially nonuniform manner.

20. The apparatus of claim 19 wherein the axial advancement of said generally axially facing surface is a function of the square of its total angular advancement.

21. The apparatus of claim 18 wherein said means (k) include a solenoid operatively coupled to said latch means, and sensor means interconnected between said solenoid and said accessory.

22. The apparatus of claim 18 further comprising means biasing said latch means toward said latched position, and means for moving said guide means back to said first position to permit movement of said latch means to said latched position by said last-mentioned biasing means.

23. The apparatus of claim 18 wherein said cam means and said cam follower means cooperate subsequent to disconnection of said engine and accessory to prevent undesired reconnection of said engine and accessory.

24. The apparatus of claim 23 further comprising means for automatically reconnecting said engine and accessory in response to disengagement of said cam follower means and said cam means.

25. A method of protecting a rotationally engine-driven accessory from damage arising from continued operation thereof by the engine subsequent to a malfunction of the accessory, said method comprising the steps of:
(a) providing a disconnect member having an axis, said disconnect member being axially slidably engageable with the engine and accessory to rotationally couple them, and axially translatable to decouple them;
(b) forming on said disconnect member a spiraled groove coaxial with said axis, said groove being configured to permit unimpeded radial entry of an object thereinto regardless of the rotational orientation of said disconnect member relative to the object;
(c) rotationally coupling the engine and accessory with said disconnect member;
(d) sensing a malfunction of the accessory during operation thereof by the engine; and
(e) responsively moving an activating member generally radially into said groove to cause axial decoupling movement of said disconnect member relative to said activating member.

26. The method of claim 25 wherein said forming step includes configuring said groove so that said decoupling movement of said disconnect member occurs with a substantially constant acceleration.

27. The method of claim 25 wherein said forming step is performed by forming a spiraling groove on said disconnect member, said groove being defined along its length by two surfaces, one of said surfaces facing at least generally axially, the other of said surfaces facing at least generally radially, each pair of adjacent spirals of said groove being circumferentially contiguous.

* * * * *